United States Patent
kim et al.

(10) Patent No.: US 9,934,878 B2
(45) Date of Patent: Apr. 3, 2018

(54) SPOT WELDING GUN AND WELDING METHOD FOR THE NUCLEAR FUEL SKELETON

(71) Applicant: KEPCO NUCLEAR FUEL CO., LTD., Daejeon (KR)

(72) Inventors: Hyung Sup kim, Daejeon (KR); Soon Gi Guk, Daejeon (KR); Se Ick Son, Daejeon (KR); Byung Tak Kim, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 335 days.

(21) Appl. No.: 14/643,188

(22) Filed: Mar. 10, 2015

(65) Prior Publication Data

US 2016/0155519 A1 Jun. 2, 2016

(30) Foreign Application Priority Data

Nov. 27, 2014 (KR) .................. 10-2014-0167365

(51) Int. Cl.
| | |
|---|---|
| B23K 11/02 | (2006.01) |
| G21C 3/334 | (2006.01) |
| B23K 11/00 | (2006.01) |
| G21C 3/34 | (2006.01) |
| G21C 21/00 | (2006.01) |
| G21C 17/10 | (2006.01) |

(52) U.S. Cl.
CPC ............ *G21C 3/334* (2013.01); *B23K 11/002* (2013.01); *G21C 3/3424* (2013.01); *G21C 21/00* (2013.01); *G21C 17/10* (2013.01); *Y02E 30/40* (2013.01)

(58) Field of Classification Search
CPC ....... B23K 9/28; B23K 11/115; B23K 11/315; B23K 11/253; B23K 11/314; B23K 11/317
USPC ............................................ 219/86.1, 89, 90
See application file for complete search history.

(56) References Cited

U.S. PATENT DOCUMENTS

| 5,928,531 A * | 7/1999 | Sato .................... B23K 11/315 |
| | | 219/86.25 |
| 2006/0212169 A1* | 9/2006 | Luthardt .............. B23K 11/314 |
| | | 700/245 |
| 2010/0270271 A1* | 10/2010 | Jacob .................... B23K 11/25 |
| | | 219/86.25 |

FOREIGN PATENT DOCUMENTS

KR  10-0526721 B1  11/2005

* cited by examiner

*Primary Examiner* — Brian Jennison
(74) *Attorney, Agent, or Firm* — Rabin & Berdo, P.C.

(57) ABSTRACT

A spot welding device for a nuclear fuel skeleton, which is assembled by spot-welding guide tubes for control rods and a instrumentation tube for measuring a state of an inside of a nuclear reactor to a spacer grid that has a plurality of cells formed in a thickness direction of a plate-shaped frame for inserting fuel rods, has a instrumentation tube hole formed at a center, and has four guide tube holes formed symmetrically above and below the instrumentation tube hole. The device includes: a welding gun including: a body, a first holder and a second holder extending from a side of the body and having respective electrodes facing each other at ends, respectively, and a driving unit disposed on the body and adjusting a distance between the electrodes; and a robot connected to the welding gun and having a rotary joint for rotating the welding gun.

4 Claims, 11 Drawing Sheets

| Item | Existing welding gun | Improve welding gun |
|---|---|---|
| Lower guide tube |  |  |
| | Welding possible after removing upper guide tube and instrumentation tube | Welding possible |
| Instrumentation tube |  |  |
| | Welding possible after removing upper guide tube | Welding possible |
| Upper guide tube |  |  |
| | Welding possible | Welding possible |

SPOT WELDING GUN AND WELDING METHOD FOR THE NUCLEAR FUEL SKELETON

BACKGROUND OF THE INVENTION

Field of the Invention

The present invention generally relates to a welding device and, more particularly, to a spot welding device for nuclear fuel skeleton which welds guide tubes for control rods and a instrumentation tube for measuring the state inside a nuclear reactor to a spacer grid supporting fuel rods in the nuclear reactor.

Description of the Related Art

A nuclear fuel skeleton is a frame for keeping fuel rods and for checking the reaction state of nuclear fuel in a nuclear reactor of a nuclear power plant. The skeleton is composed of spacer grids having a plurality of cells for fuel rods, guide tubes for control rods to be put into holes formed in the spacer grids arranged with a predetermined distance therebetween, and a instrumentation tube for measuring the state inside a nuclear reactor. The spacer grid is an important part of a nuclear fuel that fixes and supports fuel rods with uranium therein with predetermined force at predetermined distances and improves heat transfer from a nuclear reactor to a coolant.

A fuel assembly is formed by putting fuel rods into the spacer grid cells of the skeleton and nozzles to both ends of the skeleton, and although it depends on the particular models of power plants, approximately one hundred seventy-seven fuel assemblies are used for about four years in nuclear reactors under Koran standard nuclear fuel regulations.

As shown by the Chernobyl nuclear accident in the Soviet Union in 1986, a nuclear power plant requires very strict safety protocols. In particular, the nuclear fuel skeleton requires durability against extreme conditions for a long period of time in a nuclear reactor, so it is very important to perform many examinations in the process of manufacturing the nuclear fuel skeleton in order to achieve a high quality product.

The spacer grids, guide tubes, and instrumentation tube of a skeleton are formed by bulging or welding. TIG welding has been used as the welding method in the related art. All the processes of TIG welding are manually carried out in a closed chamber filled with an argon gas due to the properties of the Zirconium Alloy that is a material for spacer grids and tubes (guide tubes and instrumentation tube). This is because If TIG welding is performed in a standby state, the metal at the welded portion combined with oxygen is broken due to the metallic properties of Zirconium Alloy, so bonding is impossible.

Another reason for the requirement of manual welding is that it is difficult to set a welding angle due to narrow spaces between spacer grids, guide tubes, and a instrumentation tube, and inter-electrode contact is created at other portions of a skeleton during the process. Further, because there is a need for welding at over forty points within each grid when assembling one skeleton, the welding process is difficult.

Additionally, another reason for the requirement of manual welding of spacer grids, guide tubes, and a instrumentation tube, is that a skeleton with even a slight defect cannot be reused; thus the defect causes an economic loss.

Accordingly, for those reasons, it has been required to automate the process of assembling a skeleton that necessarily has low productivity and is expensive.

To address the above, the applicant(s) has applied for a patent titled "Robot spot welding machine for nuclear fuel skeleton and spot welding method using that", which has been disclosed in Korean Patent No. 10-0526721.

The patent is shown in FIGS. 1 to 3. The registered patent will be simply introduced and the necessity of improving the structure of welding gun will be described hereafter mainly about the matters not solved by the registered patent.

First, FIG. 1 is a front view showing the entire configuration of a welding device of the registered patent.

The robot spot welding device of the registered patent largely includes: a welding bench 200 with fixing frames 220 arranged at predetermined distances from each other to correspond to the gaps between spacer grids 110 constituting a skeleton 100; a robot 300 having a welding gun 350 and arranged in parallel with the welding bench, that is, on the rear side of the bench in the figures; electrodes inserted in guide tubes 120 and a instrumentation tube 130 to weld the spacer grids 110 and the guide tubes 120 to each other and the spacer grids and the instrumentation tube 130 to each other; and an loading table 500 aligned with the welding bench 200 to put the tubes 120 and 130 horizontally into holes 117*a*, 117*b*, 117*c*, 117*d*, and 119 formed in the spacer grids 110 to align with the height of the holes these devices.

The side with the welding bench 200 where the loading table 500 is positioned is defined as an 'upper part' and the opposite side is defined as a 'lower part' hereafter for the convenience of description.

As described above, the types of nuclear fuel skeletons depend on the types of power plants, and manufacturers. FIGS. 2A and 2B shows a spacer grid 111 of a guardian type assembly for KSNP that has been used in the past of the grids for the skeleton. Though not used now, the arrangement of guide tubes and a instrumentation tube in the spacer grid is the same as that in the spacer grid of a PLUS7 assembly for KSNP shown in FIG. 10, which is generally used at present.

As can be seen from the front view of FIG. 2A, the grid 111 is formed by laser welding on plates made of Zirconium Alloy and arranged across each other. Springs 115*a* for fixing fuel rods F are formed in cells 115 formed by the grid plates.

Further, as can be seen from the side view of FIG. 2B, two dimples 115*b* are formed on the wall of each of the cells 115 for firmly fixing the fuel rods F, that is, total eight dimples are formed.

As holes for inserting tubes in FIG. 2A, a hole 119 for a instrumentation tube 130 and holes 117*a*, 117*b*, 117*c*, and 117*d* for guide tubes 120*a*, 120*b*, 120*c*, and 120*d* are formed.

In FIG. 2B, the welding points of the tubes 120 and 130 and the grid 111 are indicated by 'W', and according to TIG welding of the related art, welding is performed not inside the cells, but at the outsides where both ends of the cells and the tubes are in contact with each other.

Such a configuration allows for automation of welding of a spacer grid, which has been performed manually in the past.

However, as can be seen from FIG. 3, it is impossible to weld the instrumentation tube 130 with the welding gun 350 selected in the registered patent due to interference with the guide tubes, particularly, the guide tube 120*d* in the entrance of the welding gun, after welding the upper guide tubes 120*c* and 120*d*.

Accordingly, in order to weld the instrumentation tube 130 and all the guide tubes 120*a*, 120*b*, 120*c*, and 120*d* with the welding gun 350, it is required to follow the welding sequence of the lower guide tubes 120*a* and 120*b*, the instrumentation tube 130, and the upper guide tubes 120c and 120d. Further, welding or repairing of the instrumentation tube 130 or the lower guide tubes 120a and 120b for several purposes including maintenace, after the upper guide tubes 120c and 120d are welded, has to be performed manually. Therefore, there is a need for developing a welding gun that can weld the instrumentation tube 130 or the lower guide tubes 120a and 120b, even if the upper guide tubes 120c and 120d are welded, regardless of the welding sequence.

The guardian type assembly for KSNP is not used any more, and the PLUS7 assembly for KSNP shown in FIG. 10 is used now. Sleeves that can be combined with guide tubes and a instrumentation tube are inserted in advance at the positions for the guide tubes and the instrumentation tube in the spacer grid of the PLUS7 assembly for KSNP, as can be seen from FIG. 10, so the electrode of a welding gun is not directed to the inside of the spacer grid in welding, but welding is performed at the positions W where the sleeves and the guide tubes or the sleeves and the instrumentation tube overlap each other. Therefore, it is also required to change the direction of the electrode of the welding gun according to the related art shown in FIG. 9.

The foregoing is intended merely to aid in the understanding of the background of the present invention, and is not intended to mean that the present invention falls within the purview of the related art that is already known to those skilled in the art.

DOCUMENTS OF RELATED ART

Korean Patent No. 10-0526721 (registered on 31 Oct., 2005)

SUMMARY OF THE INVENTION

Accordingly, the present invention has been made keeping in mind the above problems occurring in the related art, and the present invention is intended to propose a spot welding device for a nuclear fuel skeleton which has a welding gun that can be arranged without interference with previously welded tubes so that guide tubes for control rods and a instrumentation tube for measuring the state inside a nuclear reactor are welded to a spacer grid for supporting fuel rods in the nuclear reactor.

In order to achieve the above object, according to one aspect of the present invention, there is provided a spot welding device for a nuclear fuel skeleton, which is assembled by spot-welding guide tubes for control rods and a instrumentation tube for measuring a state of an inside of a nuclear reactor to a spacer grid that has a plurality of cells formed in a thickness direction of a plate-shaped frame for inserting fuel rods, has a instrumentation tube hole formed at a center, and has four guide tube holes formed symmetrically above and below the instrumentation tube hole. The spot welding device includes: a welding gun 1100 including: a body, a first holder 1110 and a second holder 1120 extending from a side of the body and having respective electrodes 1115 and 1125 facing each other at ends, respectively, and a driving unit 1130 disposed on the body and adjusting a distance between the electrodes; and a robot connected to the welding gun and having a rotary joint for rotating the welding gun, in which the first holder 1110 may have a bend 1111 bent in an extension direction from the body, a distance M between the guide tubes may be larger than a horizontal thickness T of the bend 1111, the second holder 1120 may have a stepped portion 1121 where height changes, and a shortest distance S between the stepped portion 1121 and the bend 1111 may be larger than a cross-sectional diameter D of the guide tubes.

The first holder 1110 may have a horizontal extension 1113, the bend 1111, a vertical extension 1114, and a first electrode 1115 sequentially from a joint with the body, and a vertical distance H2 between a horizontal line passing through a center of the first electrode 1115 and a bottom of the horizontal extension may be larger than a vertical distance H1 between a horizontal line passing through a center of the instrumentation tube and an upper horizontal tangent line of an upper guide tube.

The second holder 1120 may have an upper extension 1123, the stepped portion 1121, a lower extension 1124, and a second electrode 1125 sequentially from the body, and a vertical distance K between a horizontal line passing through a center of the second electrode 1125 and a bottom of the upper extension 1123 may be larger than a radius of the guide tubes, so that when a guide tube far from the welding gun 1100 is welded, the welding gun 1100 is not interfered with by an adjacent guide tube.

The welding gun may be a single welding gun so that a robot with a low capacity can be used to move the welding gun, and accordingly, it is possible to reducing the manufacturing cost of the welding device.

The spot welding device for a nuclear fuel skeleton according to the present invention has the following advantages.

First, it is possible to perform welding without interference by previously welded tubes, so processes manually achieved when there is interference by previously welded tubes can be automated, and accordingly, it is possible to considerably reduce the work process, time, and cost.

Second, since it is possible to perform welding without interference by previously welded tubes, welding can be systematically performed regardless of the welding sequence.

Third, since a single welding gun is used, the entire weight of the welding gun is reduced and a robot with a low capacity can be used, so that it is possible to reduce the costs for manufacturing and maintenance.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
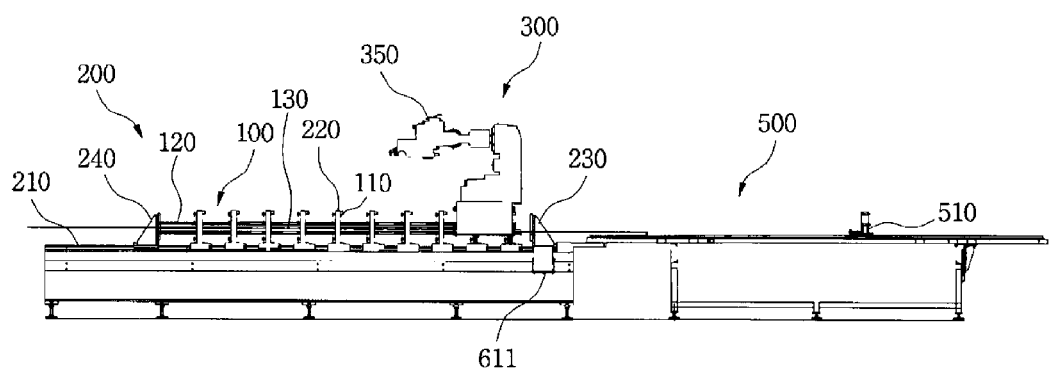
FIG. 1 is a front view showing the entire shape of a robot spot welding device for a nuclear fuel skeleton of the related art.

Hereinbelow, exemplary embodiments of the present invention will be described in detail with reference to the accompanying drawings. Throughout the drawings, the same reference numerals will refer to the same or like parts.

The present invention provides a welding device achieved by improving a welding gun 350 used in the robot spot welding device for a nuclear fuel skeleton of an existing patent. The present invention is not used only for the entire welding system for which the welding device of existing patents and may be used within a wide variety of contexts as long as there is a requirement to put a welding gun between tubes, which are fixed in parallel by a welding device, for combining a plurality of tubes in parallel, without interference by previously installed tubes.

The entire configuration and shape of the present invention will be described first with reference to FIG. 4, the principle of avoiding interference by a guide tube 120 using the components of the present invention will be described with reference to FIGS. 5 and 6, the differences from the related art will be clearly described with reference to FIG. 7, and then the advantages of a single gun, and other configurations and effects of the present invention will be described with reference to FIGS. 8 and 9.

Figure 4:
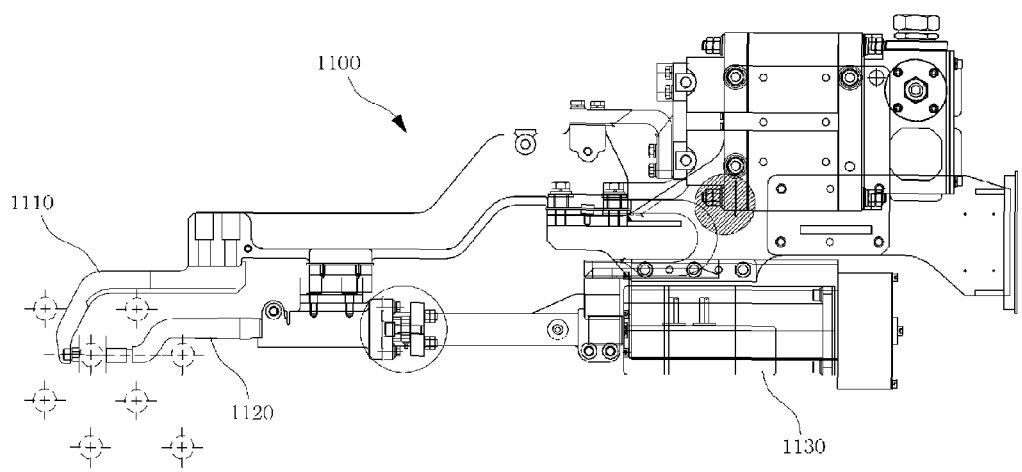
FIG. 4 is a front view showing the entire shape of a welding gun of a spot welding device for a nuclear fuel skeleton according to the present invention.

FIG. 4 is a front view showing the entire shape of a welding gun 1100 except for a robot in a spot welding device of a nuclear fuel skeleton according to the present invention.

In FIG. 4, a body corresponding to a main frame of the welding gun 1100 is positioned at the right side and a driving unit 1130 is disposed at the lowermost portion of the body. The position of the driving unit 1130 is not limited, but when the driving unit 1130 is a servo motor, the right lower end in FIG. 4 is appropriate for the position of the driving unit 1130. The advantages of the driving unit 1130 when it is a servo motor will be described below. Further, it is assumed that the driving unit 1130 is a servo motor in the following description. Further, it should be noted that a pneumatic pressing type is not excluded.

Though not shown in detail, a ball screw, a bearing, a belt, or other power transmission parts, and a cooling circuit, and a transformer, which allow for spot welding while pressing both sides of the welding points with first and second electrodes 1115 and 1125 by transmitting power from a servo motor, may be disposed in the body.

A first arm 1150 and a second arm 1160 extending to the left from the body at the right side in FIG. 4 and support a first holder 1110 and a second holder 1120, respectively.

The first electrode 1115 and the second electrode 1125 for pressure spot welding are connected to the ends of the first holder 1110 and the second holder 1120, respectively. For pressure spot welding, the first electrode 1115 and the second electrode 1125 face each other, and in FIG. 4, the first holder 1110 bends, thereby enabling first electrode 1115 and the second electrode 1125 at the ends to face each other.

The portion where the first holder 1110 bends is referred to as a bend 1111. As in FIG. 4, the bend 111 is formed not suddenly, but smoothly curved to be inserted into a space between adjacent tubes. However, as can be seen from FIG. 4, if the bend 1111 is sufficiently small in width, it can be inserted between parallel tubes even if it is bent at a right angle, so it may be formed at the right angle. The thickness, however, has to be determined within a predetermined range, because not only wires for supplying electricity, but the cooling circuit for cooling are disposed in the holder.

Though not shown in detail, the body is connected to a robot. The robot moves the entire welding gun 1100 close to of away from positions to be welded. Further, though not shown in the drawings, the robot may have a plurality of joints to smoothly move the welding gun 1100, in which one of the joints can rotate and the rotation changes the up-down position relationship between the first holder 1110 and the second holder 1120 of the welding gun 1100. That is, the welding gun 1100 has a rotary joint that can vertically rotate by 180 degrees.

In the following description, there is provided the principle of capable of inserting the welding gun 1100 between previously welded guide tubes due to the shape of the welding gun described above.

Figure 5:
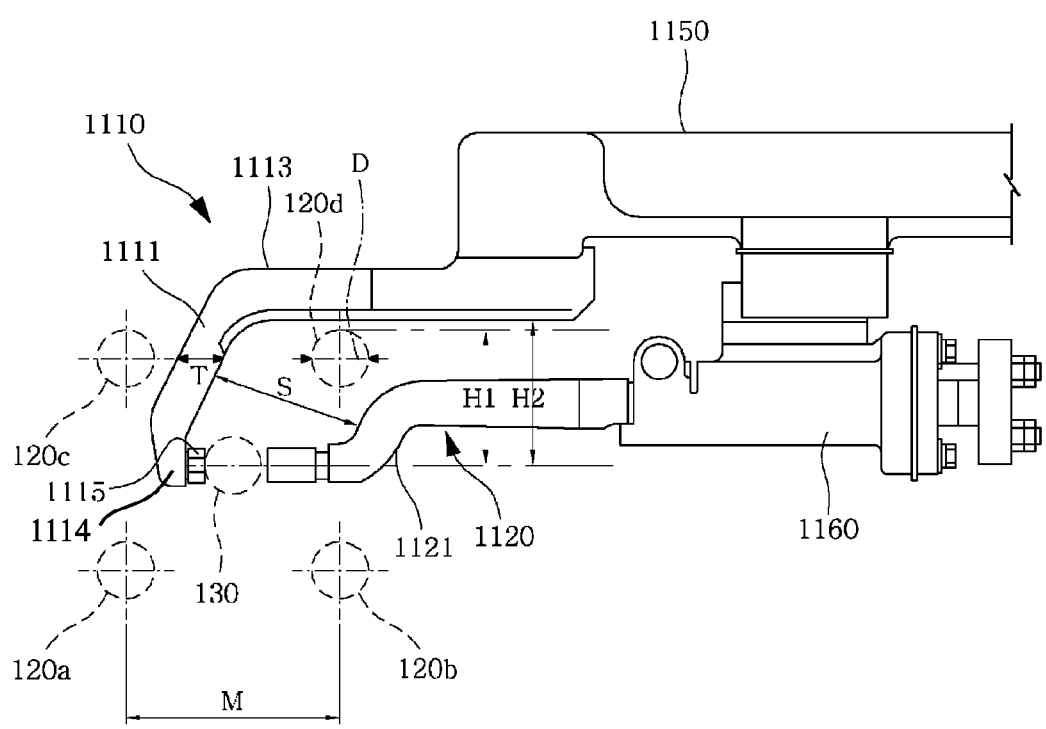
FIG. 5 is a front view showing that the welding gun of the spot welding device for a nuclear fuel skeleton according to the present invention can weld a instrumentation tube without interference by a guide tubes.
Figure 6:
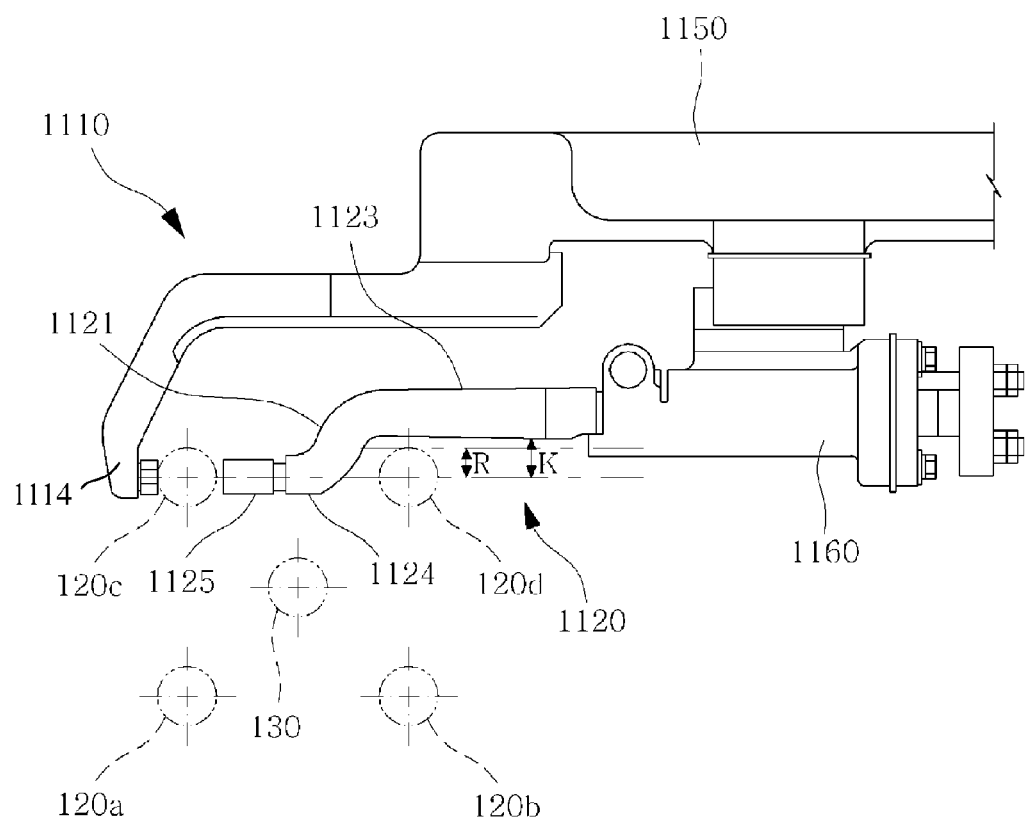
FIG. 6 is a front view showing that the welding gun of the spot welding device for a nuclear fuel skeleton according to the present invention can weld a guide tube without interference by an adjacent guide tube.

FIGS. 5 and 6 show a structure capable of inserting the welding gun 1100 according to the present invention between previously welded tubes without interference by the tubes, as an effect of the shape of the welding gun 1100. Further, the effects of the welding gun 1100 according to the present invention will be made clearer by the table comparing the welding gun 1100 with the welding gun 350 of the related art.

FIG. 5 is a plan view showing that both ends of a vertical cross-section of a instrumentation tube are welded and pressed by the first electrode 1115 and the second electrode 1125. A servo motor type may be used for pressing the ends. The servo motor type can precisely control the pressing force regardless of the position of the welding gun 1100, as compared with a pneumatic type. Further, the pneumatic type increases the weight of the welding gun 1100 due to a pneumatic cylinder and various parts for pneumatic control, but the servo motor type reduces the weight of the welding gun 1100 because it uses a motor having an appropriate capacity.

Further, a servo welding gun that applies pressing force using a servo motor can be more precisely synchronized with a robot via a program and can more quickly approach an object to be welded by a short stroke. Further, pressing force, which is one of three important factors including the time for which a welding current is supplied in resistance spot welding, can be controlled, so the welding strength can be further improved.

When a pneumatic gun is used, an unstable area is caused due to the shock of electrodes in the early stage of contacting and pressing. However, using a soft touch type controlling a servo gun can minimize the aforementioned shock by a pneumatic gun.

The shape of the welding gun 1100 of the present invention is described with reference to FIG. 5. The welding gun 1100 includes: a body; a first holder 1110 and a second holder 1120 that extend from a side of the body and have respective electrodes 1115 and 1125 facing each other at ends; and a driving unit 1130 disposed on the body and adjusts the distance between the electrodes, in which the first holder 1110 has a bend 1111 bending from the body, the horizontal distance M between guide tubes 120 is larger than the horizontal thickness T of the bend 1111, the second holder 1120 has a stepped portion 1121 where height changes, and the shortest distance S between the stepped portion 1121 and the bend 1111 is larger than the cross-sectional diameter D of the guide tubes.

Figure 3:
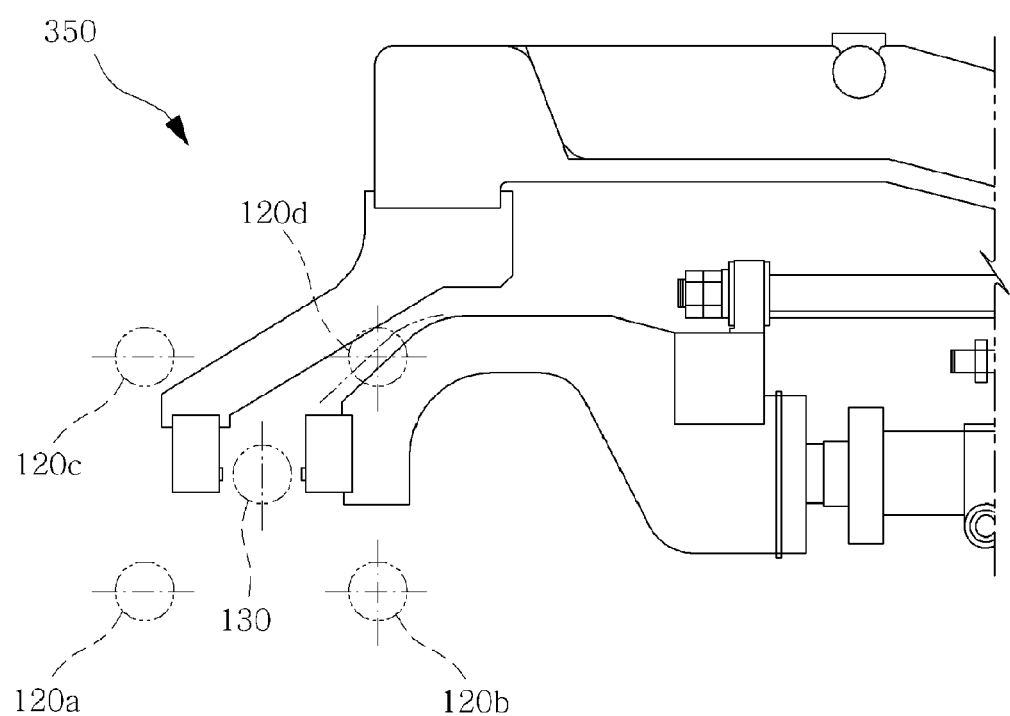
FIG. 3 is a front view showing interference with a welding gun of the robot spot welding device for a nuclear fuel skeleton of the related art by a previously welded guide tube.

Referring to FIG. 3, in the welding gun of the related art, the horizontal distance M between guide tubes is smaller than the horizontal thickness of the portion corresponding to the bend 1111. Accordingly, the condition that the horizontal thickness of the bend 1111 has to be smaller than the horizontal distance between the guide tubes 120 is one of the necessary conditions for excluding interference by previously welded guide tubes.

An additional necessary condition is that the shortest distance S between the bend 1111 and the stepped portion 1121 has to be larger than the diameter D of the guide tubes. Comparing FIGS. 3 and 5, the necessity of the additional necessary condition is made clear. Although the bend 1111 and the stepped portion 1121 are substantially in parallel in FIG. 5, they do not need to be parallel and a necessary condition is only that the shortest distance between them has to be larger than at least the diameter of the guide tubes.

Accordingly, the necessary condition that the welding gun 1100 can approach a welding point of the instrumentation tube 130 to weld the instrumentation tube 130 even with the guide tubes 120 welded first is consequently satisfied.

Interference by the guide tubes 120 welded first can be finally excluded by the additional condition, in which it is required to compare the heights shown in FIG. 5.

Referring to FIG. 5, the first holder 1110 has a horizontally extension, the bend 1111, and the first electrode 1115 sequentially from the first arm protruding from the joint with the body of the welding gun and the vertical distance H2 between the horizontal line passing through the center of the first electrode 1115 and the bottom of the horizontal extension has to be larger than the vertical distance H1 between the horizontal line passing through the center of the instrumentation tube and the upper horizontal tangent line of an upper guide tube.

Accordingly, even if the upper guide tubes 120c and 120d are welded first, it is possible to weld the instrumentation tube 130 with the welding gun 1100 without replacing the welding gun 1100. Alternatively, it is also possible to weld the skeletons of models other than the PLUS7 assembly for KSNP without replacing a welding gun.

The guide tubes 120 may interfere with the welding gun 1100 in another case, that is, when a welding gun is interfered with by adjacent guide tubes in welding, which are arranged horizontally in parallel. That is, when one guide tube is welded, there is a need for preventing a previously welded guide tube from interfering with the welding gun 1100.

Conditions for this purpose are shown in FIG. 6. Describing the configuration of the second holder 1120 in detail to explain those conditions, the second holder 1120 has an upper extension 1123, a stepped portion 1121, a lower extension 1124, and a second electrode 1125 sequentially from the body. The vertical distance K between the horizontal line passing through the center of the second electrode and the bottom of the upper extension 1123 has to be larger than the radius of the guide tube, which is a condition for excluding interference between adjacent guide tubes.

Figure 7:
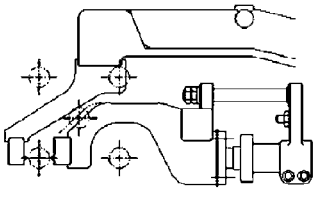
FIG. 7 is a table comparing the differences between the welding gun of the present invention and a welding gun of the related art.
Figure 7:
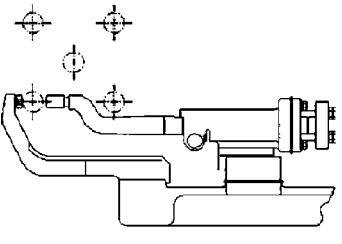
Figure 7:
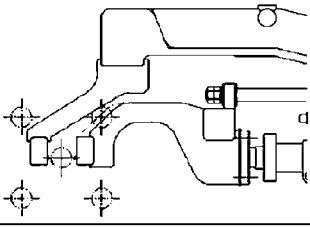
Figure 7:
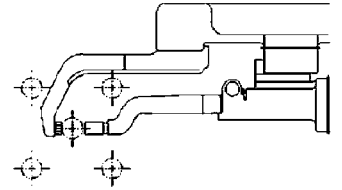
Figure 7:
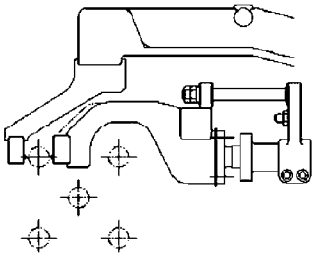
Figure 7:
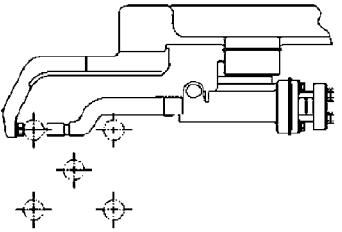
Figure 8:
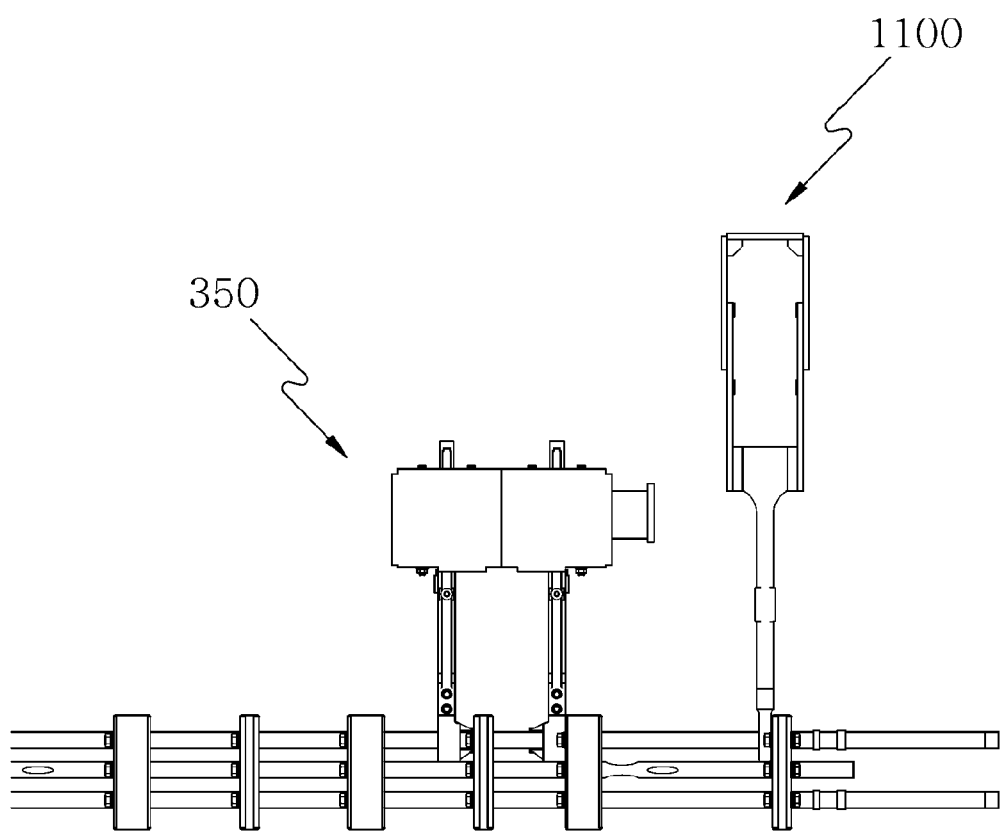
FIG. 8 is a plan view showing the welding gun of the present invention and a welding gun of the related art.

Obviously, as shown in FIG. 3, there is a structure capable of excluding interference with the welding gun 350 of the related art when another guide tube is welded, as shown in the table of FIG. 7.

However, the configuration for excluding such interference is different from that for the welding gun 350 of the related art, in that it is required to remove the problem using the shapes of the first holder 1110 and the second holder 1120 of the welding gun 1100.

The differences between the characteristics of the present invention described above and a welding gun of the related art are shown in FIG. 7.

As the conditions shown in FIGS. 5 and 6 are satisfied, the welding order becomes free. That is, in the related art, it is required to perform welding in the order of welding the lower guide tubes 120a and 120b first, and then weld the instrumentation tube 130 at least before welding the upper left guide tube 120c, but according to the present invention, welding can be achieved even if it starts with any one of the upper and lower components, unlike the related art.

For this purpose, however, another component is provided to a robot and that is a rotary joint. The configuration of an automated robot or rotary joints of a robot are well known in the art, so the detailed description is not provided. The important thing in this configuration is the fact that there is a need for a rotary joint, and referring to the table of FIG. 7, it is possible to know that the welding gun has been rotated downward by 180 degrees to weld a lower guide tube in the right upper section.

That is, it is possible to weld a lower guide tube by rotating the welding gun by 180 degrees, even if the upper guide tube and the instrumentation tube have been welded already. Accordingly, when there is no rotary joint, the lower guide tubes have to be welded at least before the upper guide tubes are welded.

However, even if there is no rotary joint, there is no priority in welding order between the lower guide tubes 120a and 120b and the instrumentation tube 130 because of the structure of the first holder 1110 and the second holder 1120.

Figure 2A:
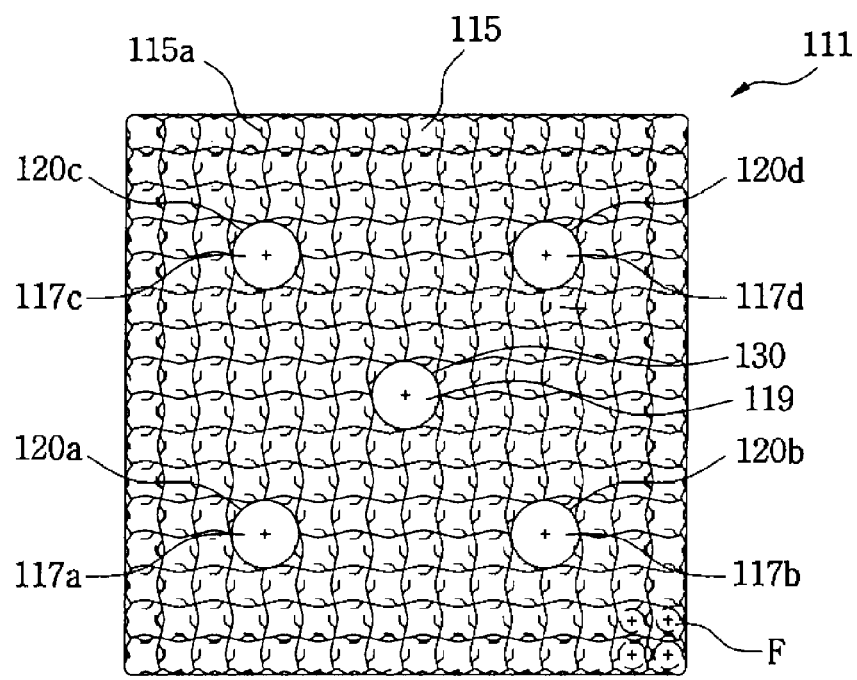
FIGS. 2A and 2B are a front view and a side view, respectively, showing a spacer grid for the robot spot welding device for a nuclear fuel skeleton of the related art and a welding device of the present invention.
Figure 2B:
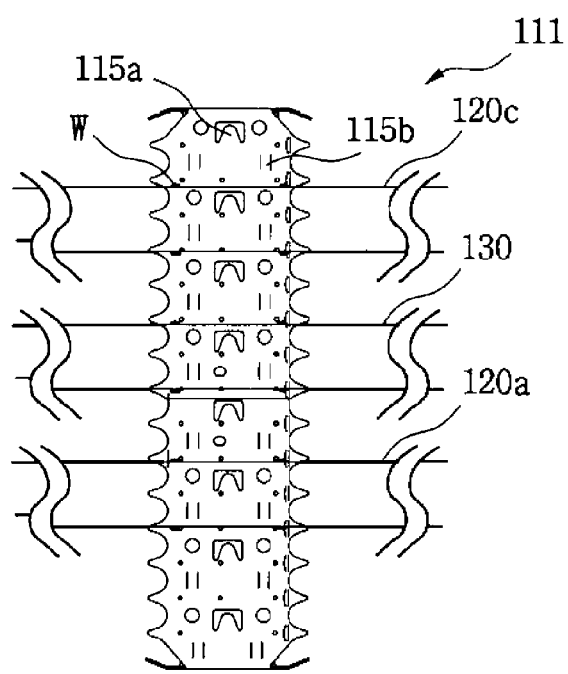
Figure 10:
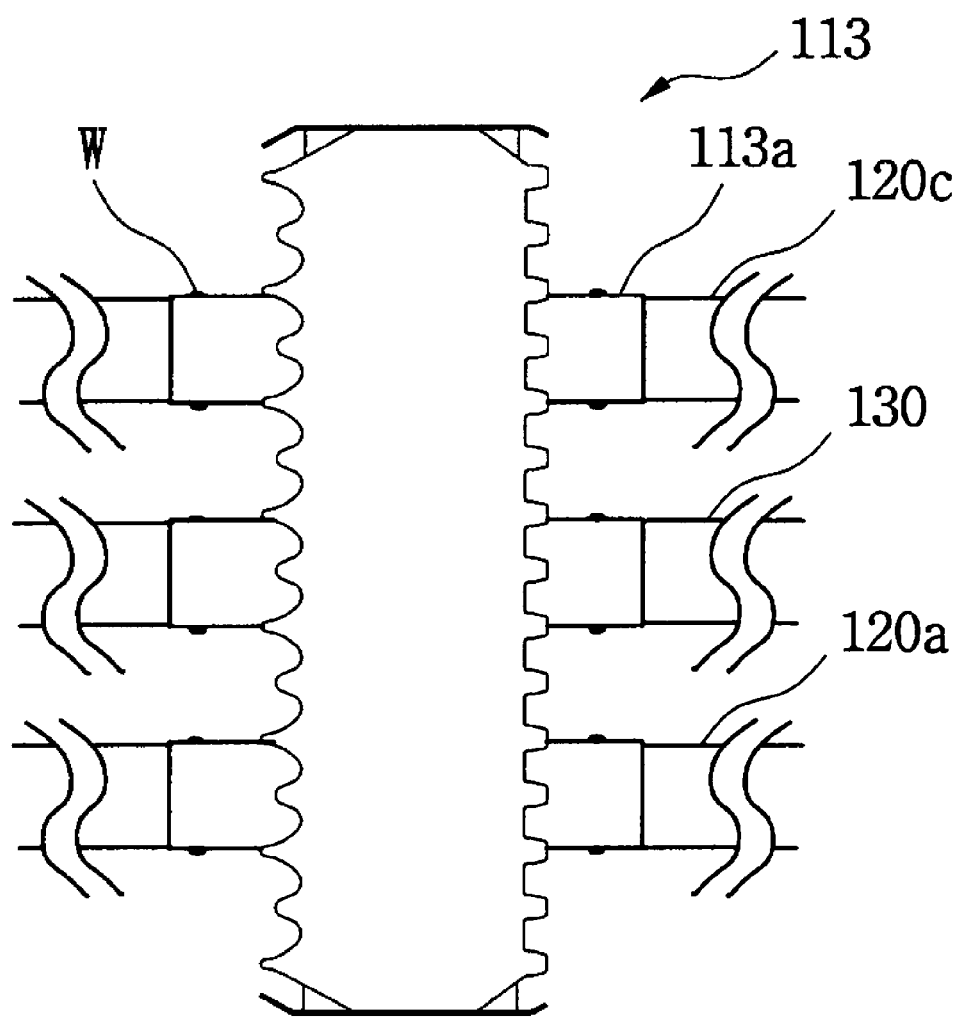
FIG. 10 is a schematic side view of a spacer grid for an improved skeleton.

On the other hand, for reference, the guardian assembly for KSNP shown in FIGS. 2A and 2B is not used any more, and the PLUS7 assembly for KSNP shown in FIG. 10 is used now. The largest difference between the spacer grids of the two assemblies is that the guide tube 120 and the instrumentation tube 130 are welded to the spacer grid of the PLUS7 assembly for KSNP through the sleeves 113a combined with the grid in advance. Accordingly, the welding points W are positioned not inside the grid, but at the outer walls of the sleeves 113a protruding outside the grid, and instead of an insertion type, a straight type may be selected for the shapes of the first electrode 1115 and the second electrode 1125.

Figure 9:
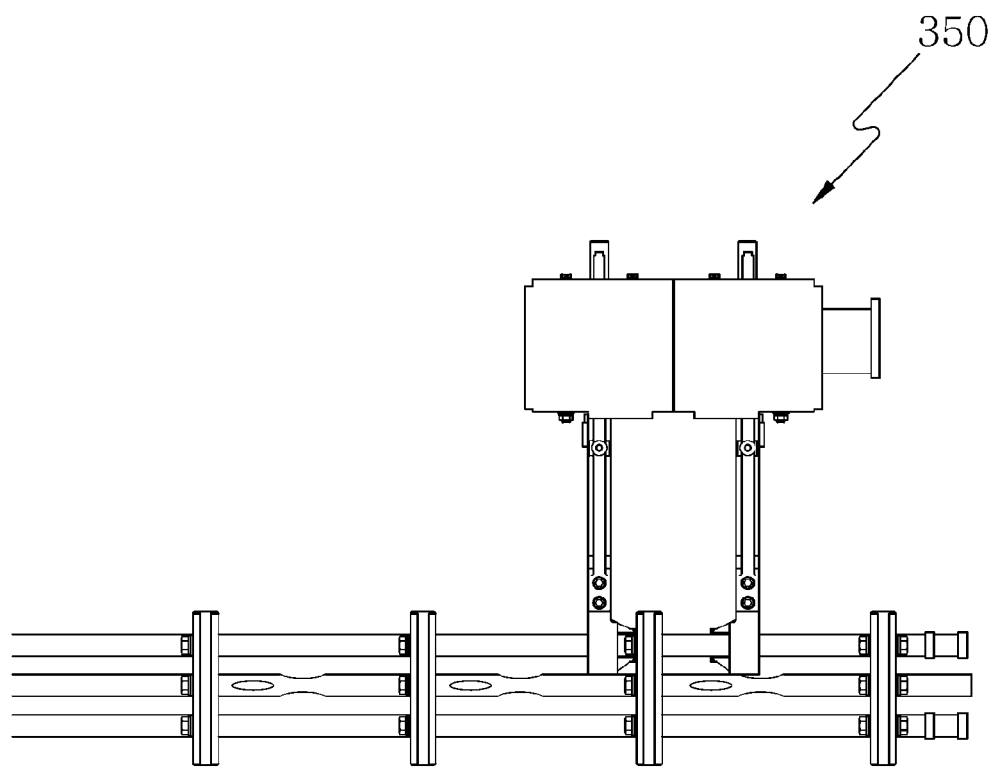
FIG. 9 is a plan view showing the process of welding by a dual gun of welding guns according to the related art.

Referring to FIG. 9, in the spacer grid of the PLUS7 assembly for KSNP, welding should be performed at portions inserted in the spacer grid, so there is a need for a single welding gun or a dual welding gun for insertion at both sides of the spacer grid, as can be seen from the welding gun 350 of the related art. This is because electrodes that are inserted in opposite directions are both needed.

However, when the spacer grid for a PLUS7 assembly for KSNP shown in FIG. 10 is used, the welding points W are positioned on the outer walls of the sleeve 113a, so the electrodes may be formed straight, and accordingly, welding can be achieved by one single welding gun, as achieved by the welding gun of the related art.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A spot welding device for assembling a nuclear fuel skeleton, wherein the nuclear fuel skeleton includes
a spacer grid having a plurality of cells,
an instrumentation tube hole disposed at a center of the nuclear fuel skeleton, and
four guide tube holes disposed symmetrically around the instrumentation tube hole, wherein each of the four guide tube holes has a diameter (D) and a radius (R) and is placed at an interval (M) with a neighboring guide tube hole, the spot welding device comprising:
a body;
a first holder including
a horizontal extension extending from a side of the body,
a vertical extension on which a first electrode is disposed, and
a bent portion having a horizontal thickness (T) and connecting the horizontal extension and the vertical extension with a predetermined degree such that a vertical distance between an outer surface of the horizontal extension and a virtual center line of the first electrode is a first height (H1);
a second holder including
an upper extension extending from the side of the body,
a lower extension on which a second electrode is disposed, wherein the second electrode is opposite to the first electrode at an end and a virtual center line of the second electrode is coincide with the virtual center line of the first electrode,
a stepped portion stepwise connecting the upper extension and the lower extension such that a vertical distance between an outer surface of the upper extension and the virtual center line of the second electrode is a second height (K); and
a driving unit disposed on the body and configured to adjust a distance between the electrodes; and
a robot connected to the welding spot device and configured to rotate the first and second holders on an axis parallel to the virtual centerline of the first electrode,
wherein the interval (M) between the guide tubes is larger than the horizontal thickness (T) of the bent portion, and a shortest distance (S) between the stepped portion of the second holder and the bent portion of the first holder is larger than the diameter (D) of the guide tubes, and
the bent portion and the horizontal extension are connected such that an interior angle between a virtual central axis of the bent portion and a virtual central axis of the horizontal extension is larger than 90 degrees, and the bent portion and the vertical extension are connected such that an interior angle between the virtual central axis of the bent portion and a virtual central axis of the vertical extension is larger than 90 degrees.

2. The spot welding device of claim 1, wherein the first height (H1) is larger than (the interval (M)+the diameter (D))/2.

3. The spot welding device of claim 1, wherein the second height (K) is larger than the radius (R) of the guide tubes.

4. The spot welding device of claim 1, wherein the spot welding device is a single welding gun.

* * * * *